(12) United States Patent
Johannsen

(10) Patent No.: US 9,745,005 B2
(45) Date of Patent: Aug. 29, 2017

(54) ROLLER ASSEMBLY FOR A TRACK-TYPE MACHINE

(71) Applicant: Caterpillar Inc., Peoria, IL (US)

(72) Inventor: Eric James Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 177 days.

(21) Appl. No.: 14/708,965

(22) Filed: May 11, 2015

(65) Prior Publication Data

US 2016/0332683 A1    Nov. 17, 2016

(51) Int. Cl.
*B62D 55/14*    (2006.01)
*B62D 55/088*   (2006.01)

(52) U.S. Cl.
CPC ........... *B62D 55/14* (2013.01); *B62D 55/088* (2013.01)

(58) Field of Classification Search
CPC .............................. B62D 55/14; B62D 55/088
USPC ........ 305/100, 107, 117, 119, 136, 138, 139
See application file for complete search history.

(56) References Cited

U.S. PATENT DOCUMENTS

| 3,843,214 | A | * | 10/1974 | Piepho | .................. | B62D 55/15 305/119 |
| 4,427,311 | A | | 1/1984 | Takenaka | | |
| 4,629,354 | A | | 12/1986 | Freese | | |
| 5,553,934 | A | * | 9/1996 | Wells | ...................... | A47F 3/001 211/59.2 |
| 6,435,629 | B1 | * | 8/2002 | Egle | ....................... | B62D 55/08 277/912 |
| 6,481,807 | B1 | | 11/2002 | Barani et al. | | |
| 2004/0084961 | A1 | * | 5/2004 | Yamamoto | ............. | B62D 55/15 305/136 |
| 2011/0121643 | A1 | | 5/2011 | Mulligan | | |
| 2012/0146397 | A1 | | 6/2012 | Hisamatsu | | |
| 2014/0125116 | A1 | * | 5/2014 | Weeks | ................... | B62D 55/20 305/100 |

FOREIGN PATENT DOCUMENTS

| CA | 1278807 | 1/1991 |
| EP | 0 306 352 B1 | 8/1993 |
| EP | 1088748 | 4/2001 |

* cited by examiner

*Primary Examiner* — S. Joseph Morano
*Assistant Examiner* — Jean Charleston
(74) *Attorney, Agent, or Firm* — Finnegan, Henderson, Farabow, Garrett & Dunner, LLP

(57) ABSTRACT

A roller assembly is disclosed. The roller assembly may have a roller shell. The roller shell may have a bore. The roller assembly may also have a substantially cylindrical shaft. The shaft may extend from a shaft proximate end to a shaft distal end. The shaft may be disposed within the bore. The roller assembly may also have a first collar disposed between the shaft proximate end and the roller shell. The first collar may be interferingly engaged with the shaft. The roller assembly may further have a second collar disposed between the shaft distal end and the roller shell. The second collar may also be interferingly engaged with the shaft.

13 Claims, 2 Drawing Sheets

ROLLER ASSEMBLY FOR A TRACK-TYPE MACHINE

TECHNICAL FIELD

The present disclosure relates generally to a roller assembly and, more particularly, to a roller assembly for a track-type machine.

BACKGROUND

Track-type machines, for example excavators, dozers, and skid-steer loaders typically include a frame that supports an internal combustion engine, and left and right undercarriages that transfer power from the engine to a ground surface. Each of the undercarriages includes one or more sprockets, driven by the engine, at one end and an idler wheel located at an opposite end. A plurality of roller assemblies support an endless track wrapped in a loop around the sprocket and idler.

Over time, wear in the roller assemblies can introduce slack in the tracks, which in turn can cause the tracks to wear excessively, break, and/or to slip off the drive sprocket and idler wheel(s). To minimize the occurrence of slack, the worn out roller assemblies must be repaired or replaced. Frequent repair or replacement of the roller assemblies can, however, increase the cost of operating the track-type machine because of the added cost of replacement parts and because the repair and replacement of the roller assemblies require the machine to be placed out of service. Accordingly, increasing the operating life and reducing replacement cost of the roller assemblies become important factors in reducing the operating expenses associated with a track-type machine.

U.S. Pat. No. 6,481,807 of Barani et al. issued on Nov. 19, 2002 ("the '807 patent") discloses a sliding roller for the tracks of tracked vehicles. In particular, the '807 patent discloses a roller having a stepped shaft with a central collar and shanks at each end of the shaft. The shanks have a smaller diameter compared to the shaft and the collar and include flat ends supported by a frame of the tracked vehicle. The '807 patent also discloses a pair of bushings arranged on either side of the collar with the shaft and bushings disposed within a roller shell. One bushing is axially located between the central collar and a shoulder on the roller shell. The other bushing is axially located between the collar and a snap ring that fits into an annular groove in the roller shell. The '807 patent discloses an embodiment with only one bushing, where the other bushing is included as an integral part of the shell. The '807 patent discloses closure covers arranged on opposite ends of the shaft. Snap rings disposed in annular grooves at either end of the shaft retain the disclosed closure covers on the shaft. The '807 patent further discloses sealing devices arranged between the bushings and closure covers. In particular, the '807 patent discloses that O-rings disposed between the bushings and the roller shell help to prevent leakage of oil from the roller.

Although the roller disclosed in the '807 patent attempts to simplify the assembly and disassembly of the roller, the disclosed roller may still be less than optimal. In particular, the disclosed roller still relies on a plurality of snap rings to retain and axially locate the bushing and the closure covers on the shaft. The disclosed roller assembly also requires a plurality of O-rings to prevent leakage of oil from the roller. The use of numerous snap rings and/or O-rings increases the cost of manufacturing the roller by increasing the number of piece-parts and the number of steps required to assemble those parts. Additionally, during operation, frictional forces within the roller can generate heat, which can cause the lubricant to degrade faster and can also increase the rate of wear of the roller components. The amount of heat generated within the roller increases as the diameter of the sealing devices increases. Because the roller of the '807 patent uses a stepped shaft, the sealing devices of the '807 patent have relatively large diameters, resulting in an increased amount of heat generation, which in turn can decrease the operating life of the roller.

The roller assembly of the present disclosure solves one or more of the problems set forth above and/or other problems of the prior art.

SUMMARY

In one aspect, the present disclosure is directed to a roller assembly. The roller assembly may include a roller shell. The roller shell may include a bore. The roller assembly may also include a substantially cylindrical shaft disposed within the bore. The shaft may extend from a shaft proximate end to a shaft distal end. The roller assembly may further include a first collar disposed between the shaft proximate end and the roller shell. The first collar may be interferingly engaged with the shaft. Additionally, the roller assembly may include a second collar disposed between the shaft distal end and the roller shell. The second collar may also be interferingly engaged with the shaft.

In another aspect, the present disclosure is directed to a roller assembly. The roller assembly may include a roller shell. The roller shell may include a bore. The roller assembly may also include a substantially cylindrical shaft disposed within the bore. The shaft may extend from a shaft proximate end to a shaft distal end. The shaft may have a substantially uniform shaft radius between the proximate end and the distal end. The shaft may also have a flange disposed between the proximal end and the distal end. The flange may have a flange radius larger than the shaft radius. The roller assembly may include a first collar disposed between the shaft proximate end and the roller shell. The first collar may be interferingly engaged with the shaft. The roller assembly may further include a second collar disposed between the shaft distal end and the roller shell. The second collar may also be interferingly engaged with the shaft. In addition, the roller assembly may include a seal assembly disposed between the first collar and the roller shell. The seal assembly may include a seal bore having a seal bore radius that exceeds the shaft radius by between about 0.05% to about 2.00%.

In yet another aspect, the present disclosure is directed to a roller assembly. The roller assembly may include a roller shell. The roller shell may include a bore. The roller assembly may also include a substantially cylindrical shaft disposed within the bore. The shaft may extend from a shaft proximate end to a shaft distal end. The shaft may have a substantially uniform shaft radius between the shaft proximate end and the shaft distal end. The shaft may also include a flange disposed between the shaft proximate end and the shaft distal end. The flange may have a flange radius larger than the shaft radius. The roller assembly may include a first collar disposed between the shaft proximate end and the roller shell. The first collar may interferingly engage with the shaft. The roller assembly may further include a second collar disposed between the shaft distal end and the roller shell. The second collar may interferingly engage with the shaft. The roller assembly may also include a bushing interferingly attached to the bore. The roller assembly may further include a first seal assembly disposed between the first collar and the roller shell. The first seal assembly may include a first seal bore. In addition, the roller assembly may include a second seal assembly disposed between the bushing and the roller shell. The second seal assembly may include a second seal bore. The first seal bore and the second seal bore may have seal bore radii that exceed the shaft radius by between about 0.05% to about 2.00%.

DETAILED DESCRIPTION

Figure 1:
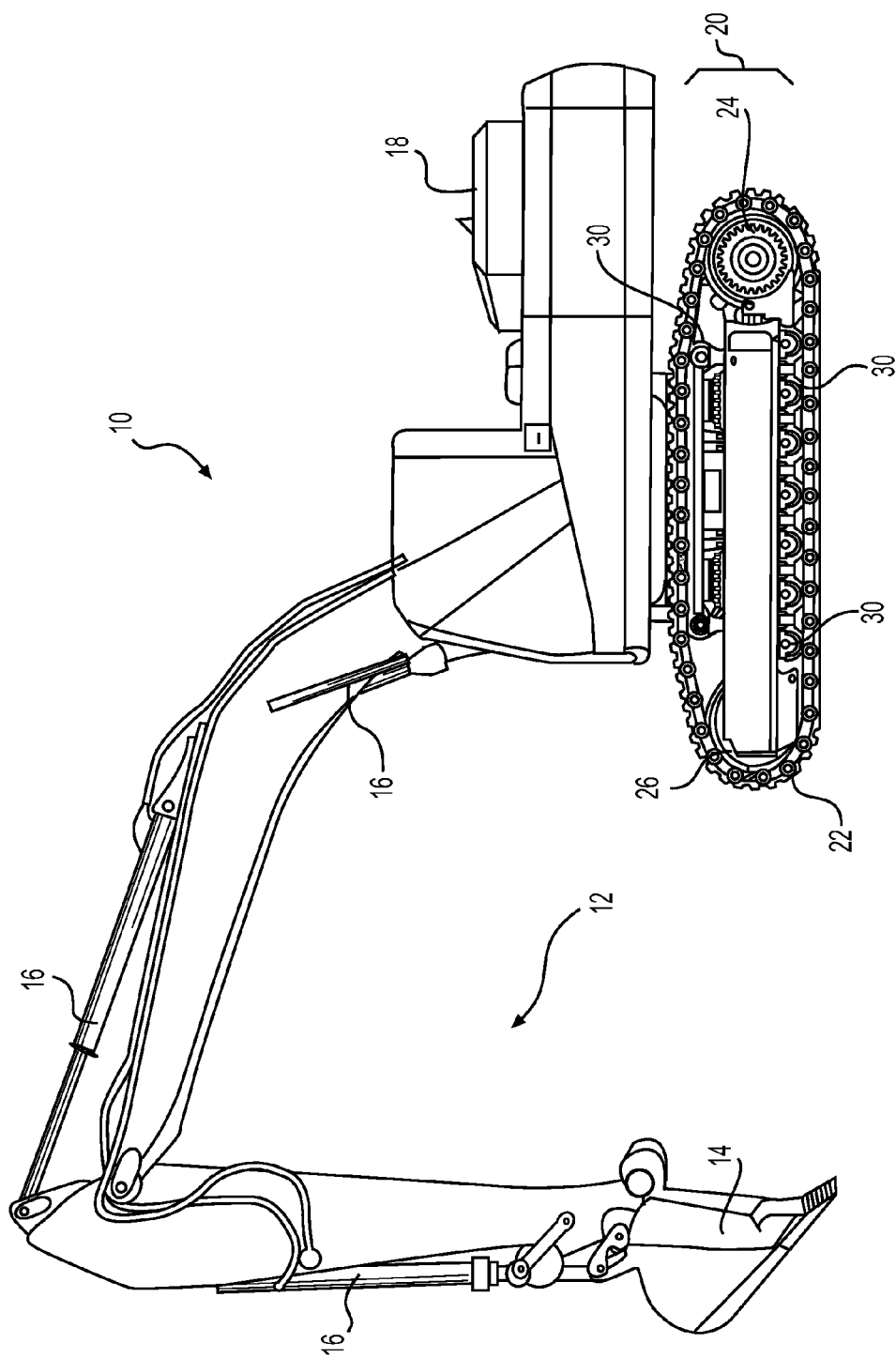
FIG. 1 is a side-view illustration of an exemplary disclosed track-type machine.

FIG. 1 illustrates an exemplary track-type machine 10. Machine 10 may be a mobile machine that performs many types of operation associated with an industry such as mining, construction, farming, transportation, or any other industry known in the art. For example, machine 10 may be a material moving machine such as an excavator, a dozer, a loader, a backhoe, a motor grader, or any other material moving machine known in the art. Machine 10 may include a linkage system 12, a work tool 14 attachable to linkage system 12, one or more actuators 16 interconnecting linkage system 12, an engine 18, and at least one traction device 20.

Traction device 20 may include parallel tracks 22 located at opposing sides of machine 10. Track 22 may be driven by engine 18 via a corresponding sprocket 24 (only one track 22 and one sprocket 24 are shown in FIG. 1). Track 22 may be wrapped around a corresponding sprocket 24, one or more idler wheels 26, and at least one roller assembly 30. Idler wheel 26 and roller assemblies 30 may guide track 22 in a general elliptical trajectory around sprocket 24.

Figure 2:
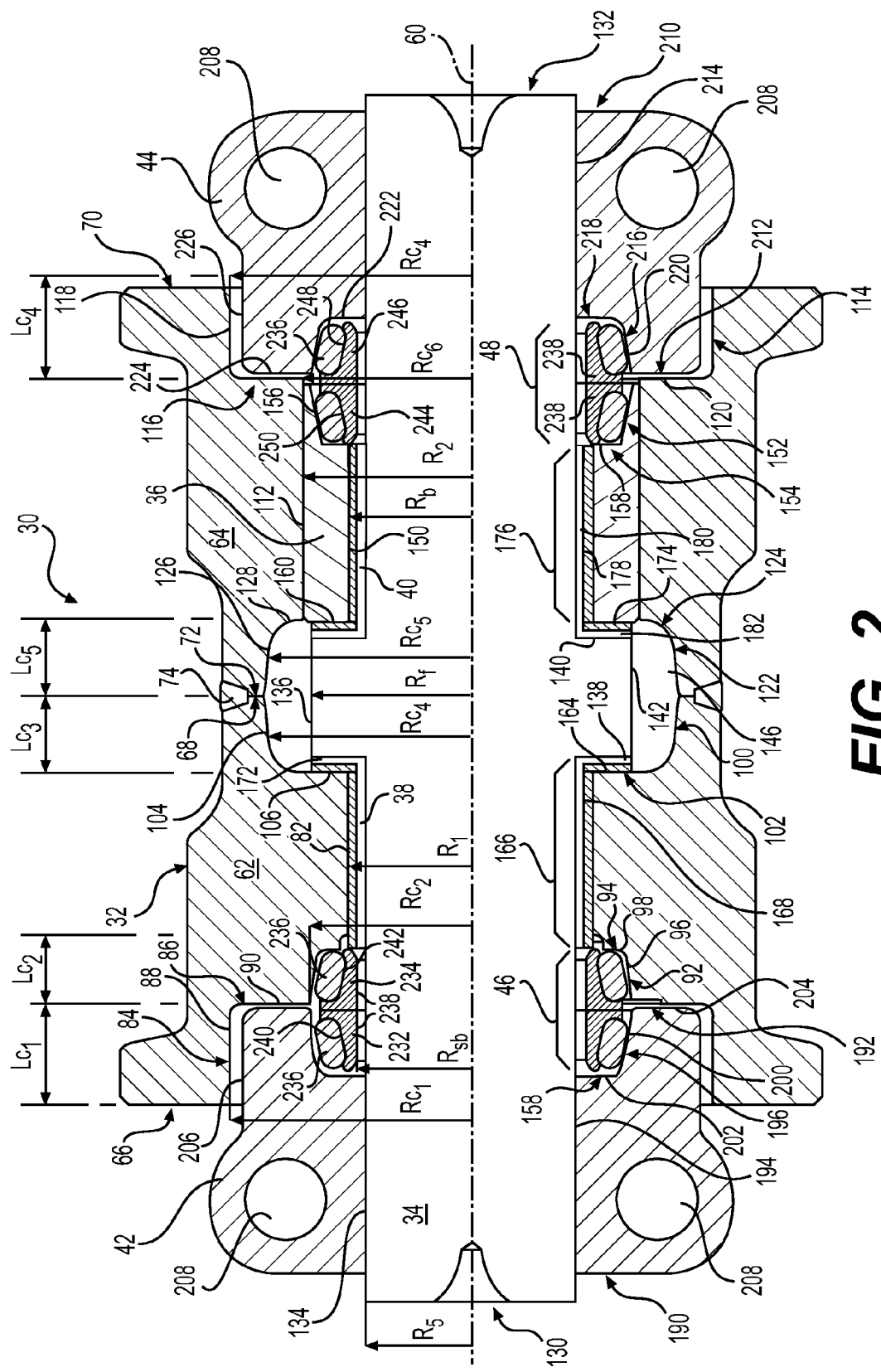
FIG. 2 is a cut-away view of an exemplary disclosed roller assembly for the machine of FIG. 1.

FIG. 2 illustrates a cut-away view of an exemplary embodiment of a roller assembly 30. Roller assembly 30 may include roller shell 32, shaft 34, bushing 36, first bearing 38, second bearing 40, first collar 42, second collar 44, first seal assembly 46, and second seal assembly 48, all disposed around rotational axis 60 of roller assembly 30. Roller shell 32 may include first shell 62 and second shell 64. First shell 62 may extend axially along rotational axis 60 from first shell front end 66 to first shell rear end 68. Second shell 64 may extend axially along rotational axis 60 from second shell front end 70 towards first shell 62 to second shell rear end 72. As illustrated in the exemplary embodiment of FIG. 2, second shell front end 70 may be disposed opposite to and axially separated from first shell front end 66. As also illustrated in FIG. 2, first shell rear end 68 may abut second shell rear end 72. First shell 62 and second shell 64 may be made via machining, forging, casting, three-dimensional printing, or by any other method of manufacturing known in the art. First shell 62 and second shell 64 may be attached at first shell rear end 68 and second shell rear end 72 via joint 74. In one exemplary embodiment as illustrated in FIG. 2, joint 74 may be a welded joint. It is contemplated, however, that first shell 62 and second shell 64 may be attached at first shell rear end 68 and second shell rear ends 72 via brazing, with fasteners, or using any other method of attachment known in the art.

First shell 62 may include a substantially cylindrical first bore 82 having a first bore radius "$R_1$." First shell 62 may further include first counterbore 84 extending axially from first shell front end 66 to first counterbore end 86 disposed between first shell front end 66 and first shell rear end 68. First counterbore 84 may have first inner surface 88 extending from first shell front end 66 to first counterbore end 86. First inner surface 88 may have a substantially cylindrical shape, having a radius "$Rc_1$," which may be larger than first bore radius $R_1$. It is contemplated, however, that first inner surface 88 may have a conical shape, for example, converging from first shell front end 66 towards first counterbore end 86. First counterbore 84 may also include first bottom face 90. In one exemplary embodiment as shown in FIG. 2, first bottom face 90 may be disposed at first counterbore end 86 substantially orthogonal to rotational axis 60. It is contemplated, however, that first bottom face 90 may be disposed non-orthogonally to rotational axis 60.

First shell 62 may also include second counterbore 92 extending axially along rotational axis 60 from first counterbore end 86 to second counterbore end 94 disposed between first counterbore end 86 and first shell rear end 68. Second counterbore 92 may have second inner surface 96 extending from first counterbore end 86 to second counterbore end 94. Second inner surface 96 may have a substantially cylindrical shape, having a radius "$Rc_2$," which may be larger than first bore radius $R_1$ and smaller than radius $Rc_1$ of first counterbore 84. It is contemplated, however, that second inner surface 96 may have a conical shape, for example, converging from first counterbore end 86 towards second counterbore end 94. Second counterbore 92 may also include second bottom face 98. In one exemplary embodiment as shown in FIG. 2, second bottom face 98 may be disposed at second counterbore end 94 substantially orthogonal to rotational axis 60. It is contemplated, however, that second bottom face 98 may be disposed non-orthogonally to rotational axis 60.

First shell 62 may also include third counterbore 100 extending axially along rotational axis 60 from first shell rear end 68 towards first shell front end 66. Third counter bore 100 may extend from first shell rear end 68 to third counterbore end 102 disposed between second counterbore end 94 and first shell rear end 68. Third counterbore 100 may have third inner surface 104 extending from first shell rear end 68 to third counterbore end 102. Third inner surface 104 may have a substantially cylindrical shape, having a radius "$Rc_3$," which may be the same as or different from one or both radii $Rc_1$ and $Rc_2$. It is contemplated, however, that third inner surface 104 may have a conical shape, for example, converging from first shell rear end 68 towards third counterbore end 102. Third counterbore 100 may also include third bottom face 106. In one exemplary embodiment as shown in FIG. 2, third bottom face 106 may be disposed at third counterbore end 102 substantially orthogonal to rotational axis 60. It is contemplated, however, that third bottom face 106 may be disposed non-orthogonally to rotational axis 60. First counterbore 84 may have an axial length "$Lc_1$," second counterbore 92 may have an axial length "$Lc_2$," and third counterbore 100 may have an axial length "$Lc_3$." It is also contemplated that first shell 62 may include any number of additional counterbores.

Second shell 64 may include a substantially cylindrical second bore 112 disposed coaxially with first bore 82. Second bore 112 may have a second bore radius "$R_2$," which may be the same as or different from first bore radius $R_1$. In one exemplary embodiment as illustrated in FIG. 2, second bore radius $R_2$ may be larger than first bore radius $R_1$. Second shell 64 may also include fourth counterbore 114 extending axially along rotational axis 60 from second shell front end 70 toward first shell 62. Fourth counterbore 114 may extend axially from second shell front end 70 to fourth counterbore end 116 disposed between second shell front end 70 and second shell rear end 72. Fourth counterbore 114 may have fourth inner surface 118 extending from second shell front end 70 to fourth counterbore end 116. Fourth inner surface 118 may have a substantially cylindrical shape, having a radius "$Rc_4$," which may be larger than second bore radius $R_2$. It is contemplated, however, that fourth inner surface 118 may have a conical shape, for example, converging from second shell front end 70 towards fourth counterbore end 116. Fourth counterbore 114 may also include fourth bottom face 120. In one exemplary embodiment as shown in FIG. 2, fourth bottom face 120 may be disposed at fourth counterbore end 116 substantially orthogonal to rotational axis 60. It is contemplated, however, that fourth bottom face 120 may be disposed non-orthogonally to rotational axis 60.

Second shell 64 may also include fifth counterbore 122 extending axially along rotational axis 60 from second shell rear end 72 towards second shell front end 70. Fifth counterbore 122 may extend axially from second shell rear end 72 to fifth counterbore end 124 disposed between fourth counterbore end 116 and second shell rear end 72. Fifth counterbore 122 may have fifth inner surface 126 extending from second shell rear end 72 to fifth counterbore end 124. Fifth inner surface 126 may have a substantially cylindrical shape, having a radius "$Rc_5$." Radii $Rc_4$ and $Rc_5$ may be the same as or different from each other and from one or more of radii $Rc_1$, $Rc_2$, $Rc_3$. It is contemplated, however, that fifth inner surface 126 may have a conical shape, for example, converging from second shell rear end 72 towards fifth counterbore end 124. Fifth counterbore 122 may also include fifth bottom face 128. In one exemplary embodiment as shown in FIG. 2, fifth bottom face 128 may be disposed at fifth counterbore end 124 substantially orthogonal to rotational axis 60. It is contemplated, however, that fifth bottom face 128 may be disposed non-orthogonally to rotational axis 60. Fourth counterbore 114 may have an axial length "$Lc_4$" and fifth counterbore 122 may have an axial length "$Lc_5$." Axial lengths $Lc_1$, $Lc_2$, $Lc_3$, $Lc_4$, and $Lc_5$ of first, second, third, fourth, and fifth counterbores, 84, 92, 100, 114, 122, respectively, may be equal or unequal. Like first shell 62, it is contemplated that second shell 64 may include any number of additional counterbores.

Shaft 34 may extend from shaft proximate end 130 to shaft distal end 132. As illustrated in FIG. 2, first and second shells 62, 64 may be disposed between shaft proximate end 130 and shaft distal end 132. Shaft 34 may be disposed within first and second bores 82, 112 of first and second shells 62, 64, respectively. Shaft 34 may have a substantially cylindrical shaft outer surface 134 having a substantially uniform radius "$R_s$" between shaft proximate end 130 and shaft distal end 136. Shaft 34 may also include a substantially cylindrical flange 136 disposed within third and fifth counterbores 100, 122 of first and second shells 62, 64, respectively. Flange 136 may have a first flange face 138 disposed substantially orthogonal to rotational axis 60 and axially separated from third bottom face 106 of third counterbore 100. Flange 136 may have a second flange face 140 disposed opposite to and axially separated from first flange face 138. Second flange face 140 may be disposed substantially orthogonal to rotational axis 60 and axially separate from fifth bottom face 128 of fifth counterbore 122. Flange 136 may have a substantially cylindrical flange outer surface 142 extending from first flange face 138 to second flange face 140. Flange outer surface 142 may have a radius "$R_f$," which may be larger than radius $R_s$ of shaft 34 and smaller than radii $Rc_3$, $Rc_5$ of third and fifth counterbores 100, 122, respectively. Thus, flange 136 and third and fifth counterbores 100, 122 may form a substantially annular cavity 146, which may be filled with lubricant, for example, oil.

Bushing 36 may extend from adjacent fifth counterbore end 124 to adjacent fourth counter bore end 116. Bushing 36 may be received within second bore 112 of second shell 64. Bushing 36 may interferingly engage with second bore 112. As used in this disclosure, the phrase "interferingly engage" indicates engagement or attachment via an interference fit. Thus, bushing 36 may be attached to second bore 112 via an interference fit. Bushing 36 may have a substantially cylindrical bushing bore 150, having a radius "$R_b$," which may be larger than radius $R_s$ of shaft 34. Bushing 36 may also include a bushing counterbore 152 extending from adjacent fourth counterbore end 116 to bushing counterbore end 154 disposed between fourth counterbore end 116 and fifth counterbore end 124. Bushing counterbore 152 may have bushing inner surface 156 extending from adjacent fourth counterbore end 116 to bushing counterbore end 154. Bushing inner surface 156 may have a substantially cylindrical shape, having a radius "$Rc_6$," which may be larger than bushing bore radius $R_b$. It is contemplated, however, that bushing inner surface 156 may have a conical shape, for example, converging from adjacent fourth counterbore end 116 towards bushing counterbore end 154. Bushing counterbore 152 may also include bushing bottom face 158. In one exemplary embodiment as shown in FIG. 2, bushing bottom face 158 may be disposed at bushing counterbore end 154 substantially orthogonal to rotational axis 60. It is contemplated, however, that bushing bottom face 158 may be disposed non-orthogonally to rotational axis 60. Bushing 36 may have bushing end face 160 disposed at fifth counterbore end 124. Bushing end face 160 may be axially separated from second flange face 140 and may be disposed generally orthogonal to rotational axis 60.

First bearing 38 may be a flanged bearing disposed slidingly and rotatingly around shaft 34. First bearing 38 may extend axially along rotational axis 60 from adjacent second counterbore end 94 to adjacent flange 136. First bearing 38 may include first bearing flange 164 and first journal portion 166. In one exemplary embodiment as illustrated in FIG. 2, first bearing flange 164 and first journal portion 166 may be separate and distinct parts which may be separately assembled. It is also contemplated, however, that first bearing flange 164 and first journal portion 166 may form an integral first bearing 38. First bearing 38 may be received in first bore 82. First bearing 38 may interferingly engage with first bore 82. Thus, first journal portion 166 of first bearing 38 may be received within first bore 82 and may be attached to first bore 82 via an interference fit. First bearing inner surface 168 of first journal portion 166 of first bearing 38 may be radially separated from shaft outer surface 134 by radial gap 170. During operation of roller assembly 30, lubricant may fill radial gap 170 to support radial loads exerted on shaft 34. First bearing flange 164 may extend radially outward from first journal portion 166. First bearing flange 164 may be disposed between third bottom face 106 of third counterbore 100 and first flange face 138 of flange 136. First bearing flange 164 may abut third bottom face 106 and may be axially separated from first flange face 138 of flange 136 by an axial gap 172. During operation of roller assembly 30, lubricant may fill axial gap 172 to support axial loads exerted on shaft 34.

Second bearing 40 may be a flanged bearing disposed slidingly and rotatingly around shaft 34. Second bearing 40 may extend axially along rotational axis 60 from adjacent bushing counterbore end 154 to adjacent flange 136. Second bearing 40 may include second bearing flange 174 and second journal portion 176. In one exemplary embodiment as illustrated in FIG. 2, second bearing flange 174 and second journal portion 176 may be separate and distinct parts which may be separately assembled. It is also contemplated, however, that second bearing flange 174 and second journal portion 176 may form an integral second bearing 40. Second bearing 40 may be received in bushing bore 150. Second bearing 40 may interferingly engage with bushing bore 150. Thus, second journal portion 176 of second bearing 40 may be received within bushing bore 150 and may be attached to bushing bore 150 via an interference fit. Second bearing inner surface 178 of second journal portion 176 of second bearing 40 may be radially separated from shaft outer surface 134 by radial gap 180. During operation of roller assembly 30, lubricant may fill radial gap 180 to support radial loads exerted on shaft 34. Second bearing flange 174 may extend radially outward from second journal portion 176. Second bearing flange 174 may be disposed between bushing end face 160 of bushing 36 and second flange face 140 of flange 136. Second bearing flange 174 may abut bushing end face 160 and may be axially separated from second flange face 140 of flange 136 by an axial gap 182. During operation of roller assembly 30, lubricant may fill axial gap 182 to support axial loads exerted on shaft 34.

First collar 42 may be disposed between shaft proximate end 130 and first shell 62 of roller shell 32. First collar 42 may extend axially from first collar front end 190 to first collar rear end 192. In one exemplary embodiment as illustrated in FIG. 2, first collar front end 190 may be disposed adjacent shaft proximate end 130 and first collar rear end 192 may be disposed adjacent first counterbore end 86. First collar 42 may include first collar bore 194. Shaft 34 may be received in first collar bore 194. First collar 42 may interferingly engage with shaft 34. Thus, first collar 42 may be attached to shaft 34 via an interference fit between first collar bore 194 and shaft 34. First collar 42 may include first collar counterbore 196, extending axially along rotational axis 60 from first collar rear end 192 to first collar counterbore end 198 disposed between first collar front end 190 and first collar rear end 192. First collar counterbore 196 may have first collar inner surface 200 extending from first collar rear end 192 to first collar counterbore end 198. First collar inner surface 200 may have a substantially cylindrical shape. It is contemplated, however, that first collar inner surface 200 may have a conical shape, for example, converging from first collar rear end 192 towards first collar counterbore end 198. First collar counterbore 196 may also include first collar bottom face 202. In one exemplary embodiment as shown in FIG. 2, first collar bottom face 202 may be disposed at first collar counterbore end 198 substantially orthogonal to rotational axis 60. It is contemplated, however, that first collar bottom face 202 may be disposed non-orthogonally to rotational axis 60. First collar 42 may also include first collar end face 204 disposed substantially orthogonal to rotational axis 60 at first collar rear end 192. First collar end face 204 may be disposed adjacent to and axially separated from first bottom face 90 of first counterbore 84. First collar 42 may also include a substantially cylindrical first collar outer surface 206, which may be slidingly received in first counterbore 84. First collar outer surface 206 may be disposed adjacent to and radially separated from first inner surface 88 of first counterbore 84. First collar 42 may include one or more holes 208. Fasteners (not shown) may pass through holes 208 to attach roller assembly 30 to machine 10.

Second collar 44 may be disposed between shaft distal end 132 and second shell 64 of roller shell 32. Second collar 44 may extend axially from second collar front end 210 to second collar rear end 212. In one exemplary embodiment as illustrated in FIG. 2, second collar front end 210 may be disposed adjacent shaft distal end 132 and second collar rear end 212 may be disposed adjacent fourth counterbore end 116. Second collar 44 may include second collar bore 214. Shaft 34 may be received in second collar bore 214. Second collar 44 may interferingly engage with shaft 34. Thus, second collar 44 may be attached to shaft 34 via an interference fit between second collar bore 214 and shaft 34. Second collar 44 may include second collar counterbore 216, extending axially along rotational axis 60 from second collar rear end 212 to second collar counterbore end 218 disposed between second collar front end 210 and second collar rear end 212. Second collar counterbore 216 may have second collar inner surface 220 extending from second collar rear end 212 to second collar counterbore end 218. Second collar inner surface 220 may have a substantially cylindrical shape. It is contemplated, however, that second collar inner surface 220 may have a conical shape, for example, converging from second collar rear end 212 towards second collar counterbore end 218. Second collar counterbore 216 may also include second collar bottom face 222. In one exemplary embodiment as shown in FIG. 2, second collar bottom face 222 may be disposed at second collar counterbore end 218 substantially orthogonal to rotational axis 60. It is contemplated, however, that second collar bottom face 222 may be disposed non-orthogonally to rotational axis 60. Second collar 44 may also include second collar end face 224 disposed substantially orthogonal to rotational axis 60 at second collar rear end 212. Second collar end face 224 may be disposed adjacent to and axially separated from fourth bottom face 120 of fourth counterbore 114. Second collar 44 may also include a substantially cylindrical second collar outer surface 226, which may be slidingly received in first counterbore 84. Second collar outer surface 226 may be disposed adjacent to and radially separated from first inner surface 88 of first counterbore 84. Second collar 44 may include one or more holes 208. Fasteners (not shown) may pass through holes 208 to attach roller assembly 30 to machine 10.

First seal assembly 46 may be disposed between first collar 42 and first shell 62 of roller shell 32 within first collar counterbore 196 and second counterbore 92. First seal assembly 46 may include first static seal ring 232, first rotating seal ring 234, and seal members 236. First static seal ring 232 and first rotating seal ring 234 may each have a seal bore 238, which may have a radius "$R_{sb}$." Radius $R_{sb}$ may be larger than a radius $R_s$ of shaft 34. In one exemplary embodiment, radius $R_{sb}$ may be about 0.05% to about 2.00% larger than radius $R_s$ of shaft 34. The difference in radius of between about 0.05% to about 2.00% of $R_s$, may help ensure that the dimensions of seal bore 238 can be made as small as possible while maintaining a clearance between seal bore 238 and shaft outer surface 134. Minimizing the dimensions of seal bore 238 in this manner may help reduce an amount of heat generated within roller assembly 30 because of friction between abutting components. In another exemplary embodiment, radius $R_{sb}$ may exceed radius $R_s$ by about 1 mm to 2 mm. As used in this disclosure the phrase "about equal" suggests that dimensions varying by an amount equal to typical manufacturing tolerances would be deemed to be about equal. For example two radii differing by a few microns would be deemed to be about equal. Similarly, the terms "substantially" and "about" as used in this disclosure are intended to account for typical manufacturing tolerances. Seal member 236 may be disposed between first collar 42 and first static seal ring 232. As illustrated in FIG. 2, seal member 236 may be disposed between inner surface 200 of first collar counterbore 196 and outer surface 240 of first static seal ring 232. First collar inner surface 200 and outer surface 240 may define an annular conical passage converging from adjacent first collar counterbore end 198 towards first collar rear end 192. Seal member 236 may be compressed by first collar inner surface 200 and outer surface 240 of first static seal ring 232, providing the forces necessary to retain first static seal ring 232 within first collar counterbore 196. First static seal ring 232 may remain stationary together with first collar 42 during operation of roller assembly 30. A separate seal member 236 may also be disposed between first shell 62 and first rotating seal ring 234. As illustrated in FIG. 2, seal member 236 may be disposed between second inner surface 96 of second counterbore 92 and outer surface 242 of first rotating seal ring 234. Second inner surface 96 and outer surface 242 may define an annular conical passage converging from adjacent first counterbore end 86 towards second counterbore end 94. Seal member 236 may be compressed by second inner surface 96 of second counterbore 92 and outer surface 242 of first rotating seal ring 234, providing the forces necessary to retain first rotating seal ring 234 within second counterbore 92. Compressed seal member 236 may also reduce leakage of lubricant from within roller assembly 30 to the ambient. First rotating seal ring 234 may rotate together with first shell 62 during operation of roller assembly 30.

Second seal assembly 48 may be disposed between second collar 44 and bushing 36 within second collar counterbore 216 and bushing counterbore 152. Second seal assembly 48 may include second static seal ring 244, second rotating seal ring 246, and seal members 236. Second static seal ring 244 and second rotating seal ring 246 may each have a seal bore 238, which may have a radius $R_{sb}$, which may be larger than a radius $R_s$ of shaft 34. Seal member 236 may be disposed between second collar 44 and second static seal ring 244. As illustrated in FIG. 2, seal member 236 may be disposed between second collar inner surface 220 of second collar counterbore 216 and outer surface 248 of second static seal ring 244. Second collar inner surface 220 and outer surface 248 may define an annular conical passage converging from adjacent second collar rear end 212 towards second counterbore end 218. Seal member 236 may be compressed by second collar inner surface 220 and outer surface 248 of second static seal ring 244, providing the forces necessary to retain second static seal ring 244 within second collar counterbore 216. Second static seal ring 244 may remain stationary together with second collar 44 during operation of roller assembly 30. A separate seal member 236 may also be disposed between bushing 36 and second rotating seal ring 246. As illustrated in FIG. 2, seal member 236 may be disposed between bushing inner surface 156 and outer surface 250 of second rotating seal ring 246. Bushing inner surface 156 and outer surface 250 may define an annular conical passage converging from adjacent fourth counterbore end 116 towards bushing counterbore end 154. Seal member 236 may be compressed by bushing inner surface 156 and outer surface 250 of second rotating seal ring 246, providing the forces necessary to retain second rotating seal ring 246 within bushing counterbore 152. Compressed seal member 236 may also reduce leakage of lubricant from within roller assembly 30 to the ambient. Second rotating seal ring 246 may rotate together with second shell 64 during operation of roller assembly 30.

INDUSTRIAL APPLICABILITY

The disclosed roller assembly 30 may be implemented on any machine 10 to support a track 22 of machine 10. The disclosed roller assembly 30 may help reduce an amount of heat generation within roller assembly 30 during operation of roller assembly 30. The disclosed roller assembly 30 may also be manufactured without the need for additional parts such as snap rings or O-rings.

Referring to FIGS. 1-2, during operation of machine 10, engine 18 may generate power output, which may be transferred to sprocket 24. Sprocket 24 may rotate in a clockwise or counter-clockwise direction in response to the power output from engine 18 and drive track 22 over one or more roller assemblies 30. As track 22 passes over roller assembly 30, roller shell 32 may rotate relative to shaft 34 around rotational axis 60. Frictional forces within roller assembly 30 between, for example, first and second journal portions 166, 176, and shaft 34, may generate heat as roller shell 32 rotates around stationary shaft 34. Frictional forces between first and second static seal rings 232, 244 and first and second rotating seal rings 234, 246 may also contribute to the heat generations. Reducing an inner radius $R_{sb}$ of seal bores 238 may help reduce an amount of heat generated within roller assembly 30. In particular, using a substantially cylindrical shaft 34, having a substantially uniform shaft radius $R_s$ may allow seal bores 238 of first and second seal assemblies 46, 48 to have a reduced inner radius $R_{sb}$. For example, inner radius $R_{sb}$ of seal bores 238 may exceed shaft radius $R_s$ by only about 1 mm to 2 mm. Thus, shaft radius $R_s$ may be selected to be as small as possible. Further, inner radius $R_{sb}$ may be selected to be slightly larger than $R_s$, for example about 1 mm to 2 mm larger than $R_s$. Reducing the radii of seal bores 238 in this manner may help reduce an amount of heat generated within roller assembly 30 during operation of roller assembly 30. The reduced amount of heat generation may in turn help reduce breakdown of any lubricant within roller assembly 30. The reduced amount of heat generation may also help reduce an amount of wear on the moving components within roller assembly 30, thereby helping to increase a useable life of roller assembly 30 and helping to reduce a frequency with which roller assemblies 30 must be repaired or replaced.

Roller assembly 30 may also help reduce a cost of manufacture of roller assembly 30. For example, by attaching first and second collars 42, 44, to shaft 34 using an interference fit, roller assembly 30 may help eliminate the need for additional components such as snap rings or fasteners for retaining first and second collars 42, 44 in their relative axial positions on shaft 34 of roller assembly 30. Attaching first and second collars 42, 44 to shaft 34 using an interference fit may also help eliminate the need for additional sealing components such as O-rings or other seal members to help prevent leakage of lubricant from within roller assembly 30 towards and out from shaft proximate end 130 or shaft distal end 132. Additionally, attaching bushing 36 to second bore 112 via an interference fit may help eliminate the need for components such as snap rings or fasteners for retaining bushing 36 within second shell 64. Using an interference fit to assemble bushing 36 in second bore 112 may also help eliminate the need for additional sealing members such as O-rings to prevent leakage of oil from cavity 146 towards second shell front end 70 and out to the ambient. Further, by disposing first and second shells 62, 64 between first and second collars 42, 44, which attach to shaft 34 via interference fits, roller assembly 30 may help eliminate the need for additional components such as snap rings or fasteners for axially locating and retaining first and second shells 62, 64 on shaft 34. Reduction of additional components in this manner may help reduce manufacturing costs by eliminating the cost of these additional components and by reducing the number of manufacturing steps required to assemble roller assembly 30.

It will be apparent to those skilled in the art that various modifications and variations can be made to the disclosed roller assembly. Other embodiments will be apparent to those skilled in the art from consideration of the specification and practice of the disclosed roller assembly. It is intended that the specification and examples be considered as exemplary only, with a true scope being indicated by the following claims and their equivalents.

What is claimed is:

1. A roller assembly, comprising:
a roller shell including a bore, a first shell extending axially from a first shell front end to a first shell rear end, the first shell including a first bore, and a second shell extending axially from a second shell front end to a second shell rear end, the second shell including a second bore, the first shell rear end being attached to the second shell rear end,
wherein the first shell includes:
a first counterbore extending axially from the first shell front end to a first counterbore end disposed between the first shell front end and the first shell rear end;
a second counterbore extending axially from the first counterbore end to a second counterbore end disposed between the first counterbore end and the first shell rear end; and
a third counterbore extending axially from the first shell rear end to a third counterbore end disposed between the second counterbore end and the first shell rear end;
and further wherein the second shell includes:
a fourth counterbore extending axially from the second shell front end to a fourth counterbore end disposed between the second shell front end and the second shell rear end; and
a fifth counterbore extending axially from the second shell rear end to a fifth counterbore end disposed between the second shell rear end and the fourth counterbore end;
a substantially cylindrical shaft extending from a shaft proximate end to a shaft distal end, the shaft being disposed within the bore, the shaft having a substantially uniform shaft radius between the shaft proximate end and the shaft distal end, and the shaft including a flange disposed between the shaft proximate end and the shaft distal end, the flange having a flange radius larger than the shaft radius;
a first collar disposed between the shaft proximate end and the roller shell, the first collar interferingly engaged with the shaft;
a second collar disposed between the shaft distal end and the roller shell, the second collar interferingly engaged with the shaft;
a bushing interferingly attached to the second bore, the bushing having a bushing bore, wherein the bushing includes a bushing counterbore extending from adjacent the fourth counterbore end to a bushing counterbore end disposed between the fourth counterbore end and the fifth counterbore end;
a first bearing interferingly attached to the first bore; and
a second bearing interferingly attached to the bushing bore, the shaft being disposed within the first bearing and the second bearing;
wherein the first collar extends from a first collar front end to a first collar rear end and includes a first collar counterbore extending axially from the first collar rear end to a first collar counterbore end disposed between the first collar front end and the first collar rear end; and
the second collar extends from a second collar front end to a second collar rear end and includes a second collar counterbore extending axially from the second collar rear end to a second collar counterbore end disposed between the second collar front end and the second collar rear end.

2. The roller assembly of claim 1, wherein the flange is disposed in the third counterbore and the fifth counterbore.

3. The roller assembly of claim 1, further including:
a first seal assembly disposed in the first collar counterbore and the second counterbore; and
a second seal assembly disposed in the second collar counterbore and the bushing counterbore.

4. The roller assembly of claim 3, wherein each of the first seal assembly and the second seal assembly includes a seal bore having a seal bore radius larger than a shaft radius.

5. A roller assembly, comprising:
a roller shell including a bore;
a substantially cylindrical shaft extending from a shaft proximate end to a shaft distal end, the shaft being disposed within the bore, the shaft having
a substantially uniform shaft radius between the shaft proximate end and the shaft distal end, and
a flange disposed between the shaft proximate end and the shaft distal end, the flange having a flange radius larger than the shaft radius;
a first collar disposed between the shaft proximate end and the roller shell, the first collar interferingly engaged with the shaft;
a second collar disposed between the shaft distal end and the roller shell, the second collar interferingly engaged with the shaft; and
a seal assembly disposed between the first collar and the roller shell, the seal assembly including a seal bore, wherein a seal bore radius exceeds the shaft radius by between about 0.05% to about 2.00%.

6. The roller assembly of claim 5, wherein the roller shell includes:
a first shell extending axially from a first shell front end to a first shell rear end, the first shell including a first bore; and
a second shell extending axially from a second shell front end to a second shell rear end, the second shell including a second bore, the first shell rear end being attached to the second shell rear end.

7. The roller assembly of claim 6, wherein the first shell includes:
a first counterbore extending axially from the first shell front end to a first counterbore end disposed between the first shell front end and the first shell rear end;
a second counterbore extending axially from the first counterbore end to a second counterbore end disposed between the first counterbore end and the first shell rear end; and
a third counterbore extending axially from the first shell rear end to a third counterbore end disposed between the second counterbore end and the first shell rear end.

8. The roller assembly of claim 7, wherein
the first collar extends from a first collar front end to a first collar rear end and includes a first collar counterbore extending axially from the first collar rear end to a first collar counterbore end disposed between the first collar front end and the first collar rear end; and
the second collar extends from a second collar front end to a second collar rear end and includes a second collar counterbore extending axially from the second collar rear end to a second collar counterbore end disposed between the second collar front end and the second collar rear end.

9. The roller assembly of claim 8, wherein the seal assembly is disposed in the first collar counterbore and the second counterbore.

10. The roller assembly of claim 9, wherein the seal assembly includes:
a static seal ring having the seal bore and a first outer surface;
a rotating seal ring disposed adjacent the static seal ring, the rotating seal ring having the seal bore and a second outer surface;
a first seal member disposed between the first outer surface and a first collar inner surface of the first collar counterbore; and
a second seal member disposed between the second outer surface and a second inner surface of the second counterbore.

11. The roller assembly of claim 10, wherein the seal assembly is a first seal assembly, and the roller assembly further includes:
a bushing interferingly attached to the second bore, the bushing including:
a bushing bore; and
a bushing counterbore; and
a second seal assembly disposed in the bushing counterbore and the second collar counterbore.

12. The roller assembly of claim 11, wherein the static seal ring is a first static seal ring, the rotating seal ring is a first rotating seal ring, and the second seal assembly includes:

a second static seal ring having the seal bore and a third outer surface;
a second rotating seal ring disposed adjacent the second static seal ring, the second rotating seal ring having the seal bore and a fourth outer surface;
a third seal member disposed between the fourth outer surface and a second collar inner surface of the second collar counterbore; and
a fourth seal member disposed between the third outer surface and a bushing inner surface of the bushing counterbore.

13. A roller assembly, comprising:
a roller shell including a first bore and a second bore;
a substantially cylindrical shaft extending from a shaft proximate end to a shaft distal end, the shaft being disposed within the first and second bores, the shaft having
a substantially uniform shaft radius between the shaft proximate end and the shaft distal end, and
a flange disposed between the shaft proximate end and the shaft distal end, the flange having a flange radius larger than the shaft radius;
a first collar disposed between the shaft proximate end and the roller shell, the first collar interferingly engaged with the shaft;
a second collar disposed between the shaft distal end and the roller shell, the second collar interferingly engaged with the shaft;
a bushing interferingly attached to the second bore;
a first seal assembly disposed between the first collar and the roller shell, the first seal assembly including a first seal bore; and
a second seal assembly disposed between the bushing and the roller shell, the second seal assembly including a second seal bore, wherein the first seal bore and the second seal bore have seal bore radii that exceed the shaft radius by between about 0.05% to about 2.00%.

* * * * *